United States Patent
Chaprales

[11] Patent Number: 6,055,761
[45] Date of Patent: May 2, 2000

[54] FISH TAG HARPOON

[75] Inventor: William C. Chaprales, Marstons Mills, Mass.

[73] Assignee: East Coast Tuna Association, Arlington, Va.

[21] Appl. No.: 08/935,500

[22] Filed: Sep. 22, 1997

Related U.S. Application Data

[60] Provisional application No. 60/026,649, Sep. 24, 1996.

[51] Int. Cl.[7] ................................................. A01K 81/00
[52] U.S. Cl. ..................................................................... 43/6
[58] Field of Search .......................... 43/6, 4.5; 294/61; 342/386; 119/862, 822, 800; 473/570, 578

[56] References Cited

U.S. PATENT DOCUMENTS

| | | | |
|---|---|---|---|
| 1,072,172 | 9/1913 | Schell | 342/386 |
| 2,708,860 | 5/1955 | Arpin | 43/6 |
| 2,758,405 | 8/1956 | Hertel | 43/6 |
| 3,715,828 | 2/1973 | Johnson | 43/6 |
| 3,945,642 | 3/1976 | Henthorn | 43/6 |
| 4,896,450 | 1/1990 | Rogers | 43/6 |
| 4,940,245 | 7/1990 | Bittlle | 273/570 |
| 4,976,442 | 12/1990 | Treadway | 273/570 |
| 5,094,463 | 3/1992 | Dryden | 273/570 |
| 5,167,417 | 12/1992 | Stacey | 273/570 |
| 5,188,373 | 2/1993 | Ferguson | 273/570 |
| 5,243,778 | 9/1993 | Henley | 43/6 |
| 5,333,881 | 8/1994 | Cugliari | 273/570 |
| 5,446,467 | 8/1995 | Willett | 342/386 |

*Primary Examiner*—Kurt Rowan
*Attorney, Agent, or Firm*—Richard P. Crowley

[57] ABSTRACT

A fish tag harpoon which contains a shock absorbing cap on the harpoon end, and contains a sonic signal-emitter secured by elastomeric bands to the harpoon, with the emitter secured by a line to a releasable retention dart at the end of the harpoon.

7 Claims, 1 Drawing Sheet

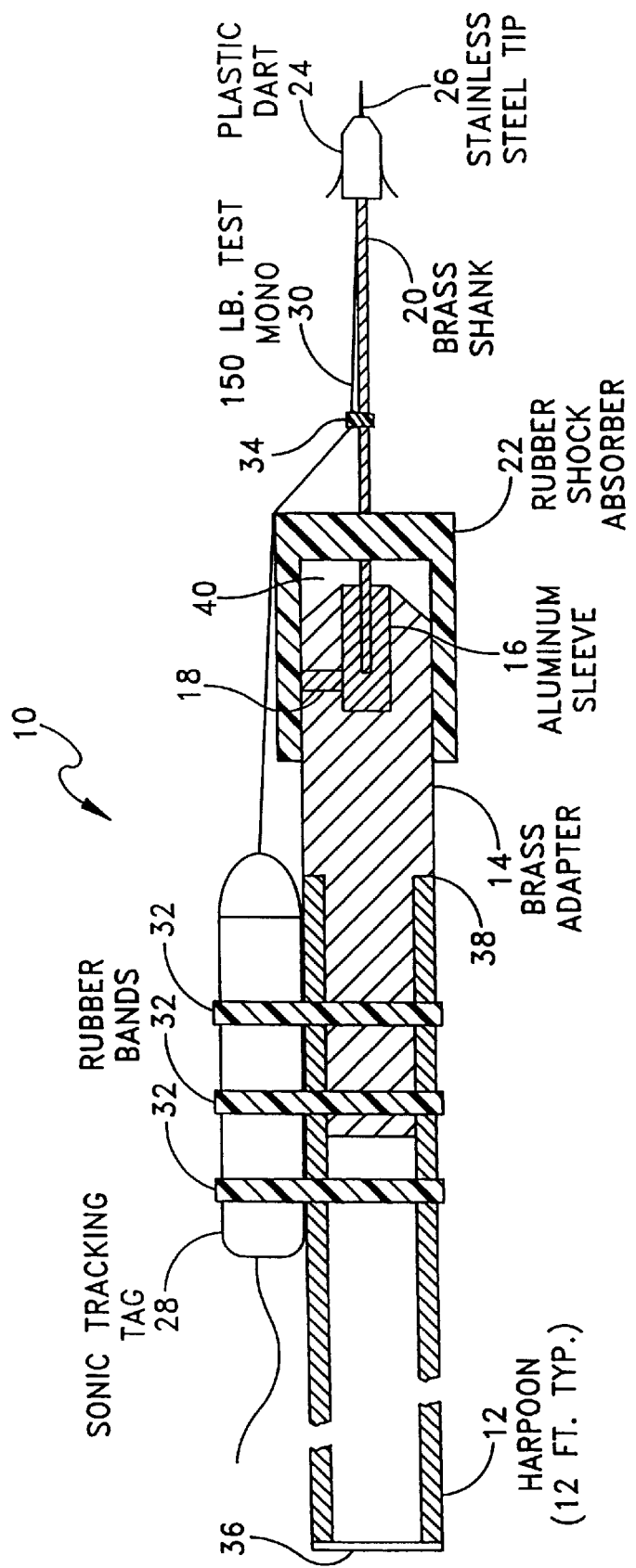

FISH TAG HARPOON

REFERENCE TO PRIOR APPLICATION

This application claims the benefit of the filing date of U.S. provisional patent application Ser. No. 60/026,649 filed Sep. 24, 1996, which is hereby incorporated by reference.

BACKGROUND OF THE INVENTION

It is often desirable for marine research or other purposes to attach a tag, such as a visual or signal emitting tag, such as a sonic tag, into a large fish, such as a bluefin tuna or shark. Typically, tags have been inserted by first catching the fish with a rod and reel, and then inserting the tag; however, this approach is not wholly satisfactory, since the fish undergoes stress, may be injured, and may not survive the tagging procedure.

It is therefore desirable to provide a fish tag harpoon and method for tagging free-swimming fish to reduce stress on the fish.

SUMMARY OF THE INVENTION

The invention relates to a fish tag harpoon, adapted for the harpooning of free-swimming fish for tagging purposes.

The fish tag harpoon comprises:

a) an elongated rod having a front end and a rear end adapted to be used as a harpoon;

b) an adapter secured to the front end of the rod and having a free end;

c) a shock absorbing means, such as a cap, comprised of a flexible elastomeric material, and spaced slightly apart from and secured around the top peripheral edge of said free end of said adapter;

d) a shank, such as a thin, flexible, metal shank, having a first end extending from said free end of said adapter, and a second end adapted to releasably secure a dart on said second end;

e) a retention dart having a releasably secured end and a tip end, such as a steel tip, secured at said second end of said shank, and adapted to be inserted in said fish, and to disengage when a fish is harpooned on said steel tip end;

f) a tag means which may include any means to tag the fish, such as; but not limited to, a self-contained, battery-operated, sonic signal emitter tracking tag;

g) means, such as one or more elastic bands, or other means, to secure the tag means to the rod prior to use, and to release by mechanical force the tag means after the fish is harpooned; and h) a line connecting said tag means to said retention dart.

The method comprises harpooning a large, free-swimming fish or any marine mammal, employing said harpoon to avoid stress or injury to the fish (by removal from the water), and to secure a tag to the fish for research, commercial tracking or identification purposes.

On harpooning the fish, the shock absorbing cap moves slightly longitudinally on contact with the fish to reduce the shock and stress to the fish, while the flexible shank with the dart and the attached tag means is secured to the fish. After the dart is secured, the shank disconnects from the dart and is retrieved with the rest of the harpoon.

The invention will be described for the purpose of illustration only, in connection with certain embodiments; however, it is recognized that various changes, modifications, additions and improvements may be made in the illustrated embodiments without departing from the spirit and scope of the invention.

BRIEF DESCRIPTION OF THE DRAWINGS

The drawing is a schematic, side-sectional, fragmentary view of the fish tag harpoon of the invention.

DESCRIPTION OF THE EMBODIMENTS

The accompanying drawing shows a side-sectional view of the fish tag harpoon of the invention 10 in a pre-use position. The harpoon rod section 12 having a one front end 38 and another rear end 36 and having a brass adapter 14 within the one front end 38 of the rod 12 with an aluminum sleeve 16 in the adapter 14 and set with an Allen screw 18 to secure the sleeve 16 in position. The free end of the adapter 14 includes brass shank 20 and a rubber shock absorber cap 22 in position on the end of the adapter 14. The cap 22 of a flexible elastomeric material is placed over the one end of the adapter 14, and in the nonuse position as shown, spaced slightly apart from the free end of the adapter 14 by a space 40. The plastic dart 24 has a stainless steel tip 26 for insertion into the fish or mammal. The dart 24 is connected to a sonic tracking tag 28, for example, a self-contained battery-operated, sonic signal-emitter, by means of a 150 pound test monofilament line 30. A plurality of rubber or elastic bands 32 releasably secures the tag 28 to the harpoon rod 12. A singular rubber band 34 releasably secures the monofilament line 30 to the brass shank 20.

In use, the harpoon is aimed at a free-swimming fish or mammal, such as a bluefin tuna, and thrown by hand to lodge the tip 26 of the dart 24 into the fish. The impact of the thrust and the resulting shock to the fish is absorbed by the shock absorber 22 at the end of the brass shank 20. Retrieval of the harpoon by the user causes the rubber bands 32 and 34 to snap and release the sonic tracking tag 28 from the harpoon rod and to have the sonic tracking tag 28 secured to the fish by line 30. The fish so tagged, may then be tracked or identified by employing a sonic receiving device to receive signals from the tag 28. In this manner, minimal stress is placed on the fish or mammal and minimal injury is caused to the creature.

What is claimed is:

1. A fish tag harpoon adapted for the signal tagging of a free-swimming fish, which harpoon comprises:

a) an elongated harpoon rod having a front end and a rear end;

b) an adapter secured to the front end of the rod and having a free end;

c) an elongated shank having a first end and a second end, the first end secured to the free end of the adapter and extending generally centrally and longitudinally therefrom;

d) a shock absorbing, elastomeric means secured to the free end of the adapter to absorb the shock of harpooning the fish, the shank extending through the shock absorbing means;

e) a retention dart releasably secured to the second end of the shank and having a tip to be inserted, on harpooning, into and secured to the fish;

f) a signal emitting tag means to tag the fish with a signal tag to identify the fish after harpooning;

g) a releasable means to secure the signal tag means to the harpoon rod and to release the signal tag means after the fish has been harpooned; and h) a connecting line to connect the signal tag means to the retention dart.

2. The harpoon of claim 1 wherein the shock absorbing means comprises a cap which is spaced slightly apart from said free end prior to use.

3. The harpoon of claim 1 wherein the adapter comprises a brass adapter which fits within and is secured to the front end of the harpoon rod.

4. The harpoon of claim 1 wherein the signal tag means comprises a self-contained, battery-operated, signal emitting means.

5. The harpoon of claim 1 wherein the releasable means comprises a plurality of rubber bands extending generally radially about the harpoon rod and the signal tag means.

6. The harpoon of claim 1 which includes a sleeve screwably and centrally secured within the free end of the adapter and the first end of the shank extending from the sleeve.

7. The harpoon of claim 1 wherein the connecting line extends from the signal tag means, generally along the shank to the retention dart and the rubber band means, to secure releasably the connecting line to the shank.

* * * * *